US008839151B2

United States Patent
Miki et al.

(10) Patent No.: US 8,839,151 B2
(45) Date of Patent: Sep. 16, 2014

(54) DEVICE AND PROGRAM FOR TRANSMITTING/PLAYING IMAGE FOLDER BASED ON AN ALBUM SETTING FOLDER FILE

(75) Inventors: Sukeichi Miki, Ikoma (JP); Shinichi Miki, Ikoma (JP); Manabu Miki, Ikoma (JP); Hikaru Miki, Ikoma (JP)

(73) Assignee: Visionarist Co., Ltd., Ikoma-shi (JP)

( * ) Notice: Subject to any disclaimer, the term of this patent is extended or adjusted under 35 U.S.C. 154(b) by 0 days.

(21) Appl. No.: 13/824,141

(22) PCT Filed: Dec. 20, 2010

(86) PCT No.: PCT/JP2010/072866
§ 371 (c)(1),
(2), (4) Date: Mar. 15, 2013

(87) PCT Pub. No.: WO2012/085993
PCT Pub. Date: Jun. 28, 2012

(65) Prior Publication Data
US 2013/0268898 A1   Oct. 10, 2013

(51) Int. Cl.
| G06F 3/048 | (2013.01) |
| G06F 3/00 | (2006.01) |
| G06F 3/041 | (2006.01) |
| H04N 5/76 | (2006.01) |
| G06F 3/0481 | (2013.01) |
| H04N 1/00 | (2006.01) |
| H04N 101/00 | (2006.01) |

(52) U.S. Cl.
CPC .... G06F 3/04817 (2013.01); *H04N 2201/0089* (2013.01); H04N 5/76 (2013.01); *H04N 1/00198* (2013.01); *H04N 2201/0084* (2013.01); *H04N 1/00127* (2013.01); *H04N 2101/00* (2013.01)
USPC ........... 715/837; 715/773; 715/767; 715/744; 715/847; 345/173; 348/231.2

(58) Field of Classification Search
CPC ............ G06F 3/04886; G06F 3/04817; G06F 9/4443; H04N 5/76; H04N 1/00127
USPC ................. 715/847, 744, 837, 767; 348/231.2
See application file for complete search history.

(56) References Cited

U.S. PATENT DOCUMENTS

| 2007/0024722 A1* | 2/2007 | Eura et al. ................... 348/231.2 |
| 2007/0089058 A1* | 4/2007 | Dias et al. ..................... 715/716 |

(Continued)

FOREIGN PATENT DOCUMENTS

| JP | 2005-244614 | 9/2005 |
| JP | 2007-306403 | 11/2007 |

(Continued)

OTHER PUBLICATIONS

International Search Report dated Mar. 29, 2011 (4 pages).

*Primary Examiner* — Alvin Tan
*Assistant Examiner* — Li Sun
(74) *Attorney, Agent, or Firm* — Crowell & Moring LLP

(57) ABSTRACT

Provided is an image folder transmission/playing device which can transmit an image folder regardless of whether or not a name of the image folder complies with DCF standard and further can display an image file included in the image folder on a monitor. A CPU determines whether or not there is an album setting folder file in the image folder. When there is no album setting folder file, the CPU creates the album setting folder file in the image folder included in the album setting folder file. The CPU transmits the image folder and displays an electronic album on the monitor in accordance with information included in the album setting folder file. Accordingly, a user can view the electronic album with a user's favorite layout.

10 Claims, 13 Drawing Sheets

(56) References Cited

U.S. PATENT DOCUMENTS

2009/0307602 A1* 12/2009 Brewer et al. ................. 715/744
2011/0102327 A1   5/2011 Miki et al.
2011/0209224 A1*  8/2011 Gentile et al. ................. 726/27
2012/0117474 A1   5/2012 Miki et al.

FOREIGN PATENT DOCUMENTS

| JP | 4309468 | 5/2009 |
| JP | 4416836 | 12/2009 |

* cited by examiner

FIG. 4

| | | | |
|---|---|---|---|
| ALBUM TITLE CANDIDATE | SHOOTING DATE | AUGUST 8, 2010 | 54a |
| | SHOOTING LOCATION | SUNSET BEACH OKINAWA | 54b |
| | SHOOTING PERSON | KEN | 54c |
| | DATE ATTRIBUTE | SUMMER VACATION | 54d |
| | SHOOTING MODE | PORTRAIT | 54e |
| | EQUIPMENT MANUFACTURER NAME | XYZ | 54f |
| | EQUIPMENT MODEL NAME | M101 | 54g |
| | IMAGE TITLE | 10100001 | 54h |
| ALBUM TITLE | SHOOTING DATE | AUGUST 8, 2010 | 43 |
| | SHOOTING LOCATION | SUNSET BEACH OKINAWA | |
| | SHOOTING PERSON | KEN | |

FIG. 6

| | | | | 53 |
|---|---|---|---|---|
| 59 | FONT PATTERN | | Arial<br>Arial Narrow<br>Bookman Old Style<br>Century Gothic<br>Courier New<br>Garamond<br>.<br>.<br>.<br>Symbol<br>Tahoma<br>Terminal | |
| 60 | TEXT ATTRIBUTE | 43 ALBUM TITLE | FONT | Century Gothic |
| | | | FONT SIZE | 18pt |
| | | | CONTENT | AUGUST 8, 2010<br>SUNSET BEACH OKINAWA<br>KEN |
| | | 45 TEXT | FONT | Century Gothic |
| | | | FONT SIZE | 16pt |
| | | | CONTENT | CRAB APPEARED!<br>I WENT SWIMMING IN<br>OKINAWA SEA WITH MY FATHER.<br>CRAB APPEARD AND MY<br>BROTHER WAS SURPRISED. |
| | | 47 MESSAGE | FONT | Garamond |
| | | | FONT SIZE | 16pt |
| | | | CONTENT | TYPHOON WAS APPROACHING<br>OKINAWA. TYPHOON MADE<br>LANDFALL ON OKINAWA ON<br>AUGUST 9. |
| | | 50 DIALOGUE | FONT | Symbol |
| | | | FONT SIZE | 16pt |
| | | | CONTENT | WOW! CRAB! |

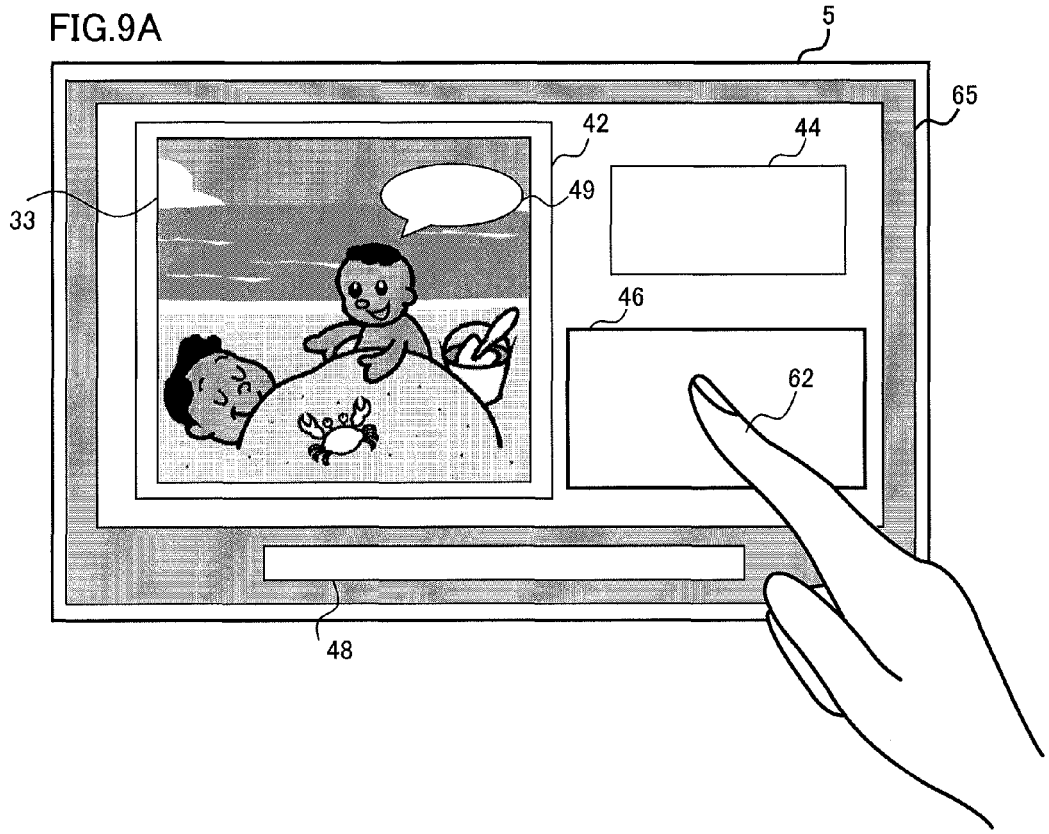
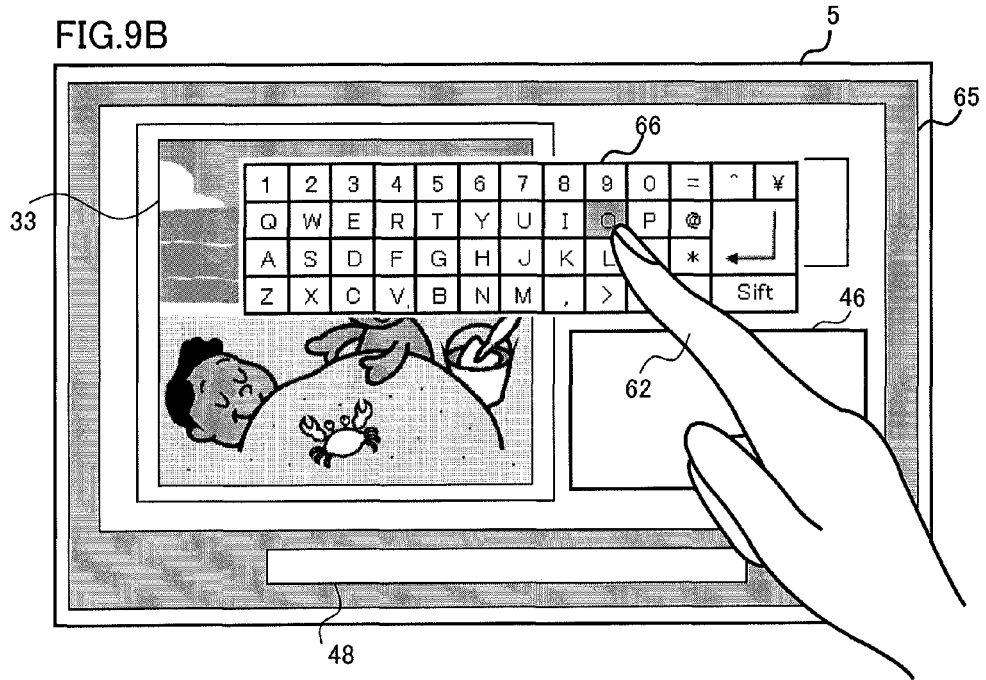

FIG. 10

IMAGE FOLDER SEARCH SCREEN — 67

ALBUM TITLE CANDIDATE

| SHOOTING DATE | SHOOTING LOCATION | SHOOTING PERSON | DATE ATTRIBUTE | SHOOTING MODE | EQUIPMENT MANUFACTURER NAME | EQUIPMENT MODEL NAME | IMAGE TITLE | TEXT MESSAGE DIALOGUE CHARACTER STRING |
|---|---|---|---|---|---|---|---|---|
| AUGUST 8, 2010 | SUNSET BEACH OKINAWA | KEN | SUMMER VACATION | PORTRAIT | XYZ | M101 | 10100001 | CRAB FATHER OKINAWA SWIMMING IN SEA BROTHER |
| JULY 4, 2010 | OAHU ISLAND | GEORGE | INDEPENDENT DAY | NIGHT VIEW | XYZ | XYZ1000 | 10300025 | HAWAII TRIP RESTAURANT BEER FIREWORK |
| MAY 12, 2010 | TOKYO | LISA | BIRTHDAY | LANDSCAPE | ABCD | AB_101 | TOKYO01 | HOTEL CAKE CANDLE SONG PRESENT |

(68 brace groups the last five columns)

[ DISPLAY ELECTRONIC ALBUM ] — 69

DEVICE AND PROGRAM FOR TRANSMITTING/PLAYING IMAGE FOLDER BASED ON AN ALBUM SETTING FOLDER FILE

TECHNICAL FIELD

The present invention relates to an image folder transmission/playing device and an image folder transmission/reception program which can transmit and display an image folder for each image folder regardless of whether or not a name of an image folder or an image file is changed or a text information is added to the image folder or the image file.

BACKGROUND ART

Recently, a capacity increase and a price reduction of a storage device which complies with DCF (Design rule for Camera File system) standard enable a user to store large volumes of image files taken by a digital camera. The user separates or classifies an image folder which includes the large volumes of image files, an image directory, or a cluster of image files in accordance with a shooting date, an event, or the like, changes a name of the image folder, and further adds a commentary to the image folder, for example, to manage the image folder. An image playing device, which plays an image file, cannot play the image file included in an image folder whose name is changed to a name which does not comply with DCF standard to ensure playing compatibility. In order to solve the above problem, there is a suggestion of a method which enables a playing of an image file even when a directory name, which does not comply with the DCF standard, is provided to a directory, which is an image folder. Moreover, there is also a suggestion of a method for displaying a commentary obtained from Exif (Exchangeable image file format for digital still cameras) data on an image display unit with an image file.

For example, there is a known image playing device which creates a management file having a second directory name, which does not comply with the DCF standard, in addition to a directory name which complies with the DCF standard, when the director name which does not comply with the DCF standard is provided to the directory (for example, refer to Patent Document 1).

Moreover, for example, there is a suggestion of an image data display system for playing an image which ensures the playing compatibility by automatically providing a directory name which complies with the DCF standard to a directory again when an optical character string is inputted by a user and thus the directory name is changed to a name which does not comply with the DCF standard (refer to Patent Document 2).

Furthermore, for example, there is a suggestion of a photo album controller which changes a folder name and further plays a commentary, which is provided to an image, with the image when playing the image (refer to Patent Document 3).

However, in the technique described in the Patent Document 1, the image cannot be played when the directory name which has the image is already changed to a name which does not comply with the DCF standard.

Moreover, in the technique described in the Patent Document 2, there is a problem that the directory name is changed against the user's will to ensure the playing compatibility even when the user changes the directory name.

Furthermore, in the technique described in the Patent Document 3, the commentary is provided not to the image folder having plural images but to each image, so that the commentary cannot be displayed for each image folder.

PRIOR ART DOCUMENT(S)

Patent Document(s)

Patent Document 1: Japanese Laid-Open Patent Publication No. 2007-306403
Patent Document 2: Japanese Patent No. 4416836
Patent Document 3: Japanese Patent No. 4309468

SUMMARY OF THE INVENTION

Problems to be Solved by the Invention

The present invention is to solve the above problems, and an object of the present invention is to provide an image folder transmission/playing device and an image folder transmission/playing program which can display an image file on the image folder transmission/playing device regardless of whether or not a name of an image folder, which is stored in the image folder transmission/playing device or a storage device, complies with DCF standard when the image folder which is a cluster of plural image files is transmitted and also can set a position or a size of the image file and a text displayed on the image folder transmission/playing device.

Means to Solve the Problem(s)

To achieve the above object, an image folder transmission/playing device which displays an image file or a character stored in an image folder according to one aspect of the present invention includes: an image display unit which displays the image file or the character; an input unit to which the character or an operation command is inputted by a user; a control unit which controls the image folder transmission/playing device; a memory unit which stores a control program to operate the control unit; a storage device connection unit to which a storage device, which stores the image folder, is connected; and a communication unit which transmits and receives the image folder via a wire communication or a wireless communication, wherein the memory unit stores a display program which displays the image file stored in the image folder and an attribute information of the image file on the image display unit, and when the storage device is connected to the storage device connection unit or when the communication unit receives the image folder, the control unit performs processings of: determining whether or not there is an album setting folder file which displays the image file stored in the image folder or the attribute information of the image file on the image display unit for each image folder as an electronic album; creating the album setting folder file in the image folder when there is no album setting folder file in the image folder; and displaying the electronic album on the image display unit in accordance with information included in the album setting folder file when there is the album setting folder file in the image folder.

According to the above configuration, the image folder stored in the image display device and the storage device includes the album setting folder file, so that even when a name of the image folder does not comply with DCF standard, the electronic album can be displayed on the image display unit.

In another aspect of the present invention, the attribute information is FAT (File Allocation Table) data or Exif (Exchangeable Image File Format) data of the image file, and the control unit performs processings of: creating an album title file used for creating an album title of the electronic album in the album setting folder file when the album setting folder file is created in the image folder; selecting one image file from the one or plural image files stored in the image folder and referring to the FAT data or the Exif data of the image file; converting date information, time information, or GPS (Global Positioning System) information included in the FAT data or the Exif data as a numerical value into a predetermined character string and storing the character string in the album title file as an album title candidate and storing image title information, shooting person information, or an equipment information included in the FAT data or the Exif data as a text data without change as the album title candidate in the album title file; storing a selected album title candidate in the album title file as the album title when at least one album title candidate is selected via the input unit; and displaying the electronic album on the image display unit in accordance with the album title file.

According to the above configuration, the album title file is created in the album setting folder file, so that the user can display the image file and the album title on the image display unit as the electronic album. Moreover, since the album title is created in accordance with the FAT data or the Exif data of the image file, the user can easily create the desired album title.

In still another aspect of the present invention, the control unit performs processings of: further creating a layout file which has information of an album layout for the electronic album displayed on the image display unit and a text file which has an optional text inputted via the input unit in the album setting folder file when the album setting folder file is created in the image folder; storing plural album layout candidates as templates of the album layout, the album layout candidate selected via the input unit as the album layout, a position or a range of the image file, the album title, or the text displayed on the image display unit in the layout file; storing plural font patterns for the album title or the text and the font pattern selected via the input unit and a font size inputted via the input unit in association with the album title or the text in the text file; and displaying the electronic album on the image display unit in accordance with the layout file or the text file.

According to the above configuration, since the layout file includes the plural album layout candidates, the user can easily determine the layout for the image file, the album title, or the optional text displayed on the image display unit. Moreover, since the position or the range of the image file, the album title, or the text displayed on the image display unit is included in the layout file, the user can create the favorite layout.

In still another aspect of the present invention, the control unit performs processings of: associating the character string included in the album title file or the text file with the image folder and displaying the character string on the image display unit when a command of searching for the image folder is inputted via the input unit; and displaying the electronic album on the image display unit when the image folder is selected via the input unit.

According to the above configuration, the user can search for the image folder in accordance with the familiar character string. Thus, the user can rapidly display the desired electronic album on the image display unit.

In still another aspect of the present invention, a storage device used for the image folder transmission/playing device, includes: an image folder transmission/playing device connection unit to which the image folder transmission/playing device is connected; and an image memory unit which stores the image folder and the display program.

According to the above configuration, the image folder stored in the storage device can be displayed on the image folder transmission/playing device as the electronic album regardless of the configuration of the image folder transmission/playing device.

In still another aspect of the present invention, an adapter device used for the image folder transmission/playing device and connected to the storage device, includes: an image folder transmission/playing device connection unit to which the image folder transmission/playing device is connected; a storage device connection unit to which the storage device is connected; and a program memory unit which stores the display program.

According to the above configuration, the image folder stored in the storage device can be displayed on the image folder transmission/playing device as the electronic album regardless of the configuration of the image folder transmission/playing device and the storage device.

In still another aspect of the present invention, in an image folder transmission/playing program which displays an image file using a computer which includes an image display unit which displays the image file or a character, an input unit to which the character or an operation command is inputted by a user, a storage device connection unit to which a storage device is connected, a control unit which controls an image folder transmission/playing device, a memory unit which stores a control program to operate the control unit, the image folder transmission/playing device, and a communication unit which transmits and receives the image folder via a wire communication or a wireless communication, when a storage device is connected to a storage device connection unit or when the communication unit receives the image folder, the control unit performs steps of: determining whether or not there is an album setting folder file which displays the image file stored in the image folder or the attribute information of the image file on the image display unit for each image folder as an electronic album in the image folder; creating the album setting folder file in the image folder when there is no album setting folder file in the image folder; and displaying the electronic album on the image display unit in accordance with information included in the album setting folder file when there is the album setting folder file in the image folder.

According to the above configuration, the user stores the album setting folder file in the image folder stored in the image folder transmission/playing device and the storage device using the computer, so that even when a name of the image folder does not comply with the DCF standard, the image file can be displayed on the image display unit.

In still another aspect of the present invention, the attribute information is FAT data or Exif data of the image file, and the control unit performs steps of: creating an album title file used for creating an album title of the electronic album in the album setting folder file when the album setting folder file is created in the image folder; selecting one image file from the one or plural image files included in the image folder and referring to the FAT data or the Exif data of the image file; converting date information, time information, or GPS information included in the FAT data or the Exif data as a numerical value into a predetermined character string and storing the character string in the album title file as an album title candidate and storing image title information, shooting person information, or an equipment information included in the FAT data or the Exif data as a text data without change as the album title candidate in the album title file; storing a selected album title candidate in the album title file as the album title when at least one album title candidate is selected via the input unit; and displaying the electronic album on the image display unit in accordance with the album title file.

According to the above configuration, the user creates the album title file in the album setting folder file using the computer, so that the user can display the image file and the album title on the image display unit as the electronic album. Moreover, the user creates the album title file in accordance with the FAT data or the Exif data of the image file, so that the user can easily create the desired album title.

In still another aspect of the present invention, the control unit performs steps of: further creating a layout file which has information of an album layout for the electronic album displayed on the image display unit and a text file which has an optional text inputted via the input unit in the album setting folder file when the album setting folder file is created in the image folder; storing plural album layout candidates as templates of the album layout, the album layout candidate selected via the input unit as the album layout, a position or a range of the image file, the album title, or the text displayed on the image display unit in the layout file; storing plural font patterns for the album title or the text and the font pattern selected via the input unit and a font size inputted via the input unit in association with the album title or the text in the text file; and displaying the electronic album on the image display unit in accordance with the layout file and the text file.

According to the above configuration, the user stores the plural album layout candidates in the layout file using the computer, so that the user can easily determine the layout for the image file, the album title, or the optional text displayed on the image display unit. Moreover, the user stores the position or the range of the image file, the album title, or the text displayed on the image display unit in the layout file using the computer, so that the user can create the favorite layout.

In still another aspect of the present invention, the control unit performs steps of: associating the character string included in the album title file or the text file with the image folder and displaying the character string on the image display unit when a command of searching for the image folder is inputted via the input unit; and displaying the electronic album on the image display unit when the image folder is selected via the input unit.

According to the above configuration, the user can search for the image folder in accordance with the familiar character string using the computer. Thus, the user can rapidly display the desired electronic album on the image display unit.

BRIEF DESCRIPTION OF THE DRAWINGS

FIG. 4 is a configuration diagram of an album title file according to the first preferred embodiment.

FIG. 6 is a configuration diagram of a text file according to the first preferred embodiment.

FIGS. 9A and 9B are diagrams showing a text input screen according to the first preferred embodiment.

FIG. 10 is a diagram showing an image folder search screen according to the first preferred embodiment.

Figure 1:
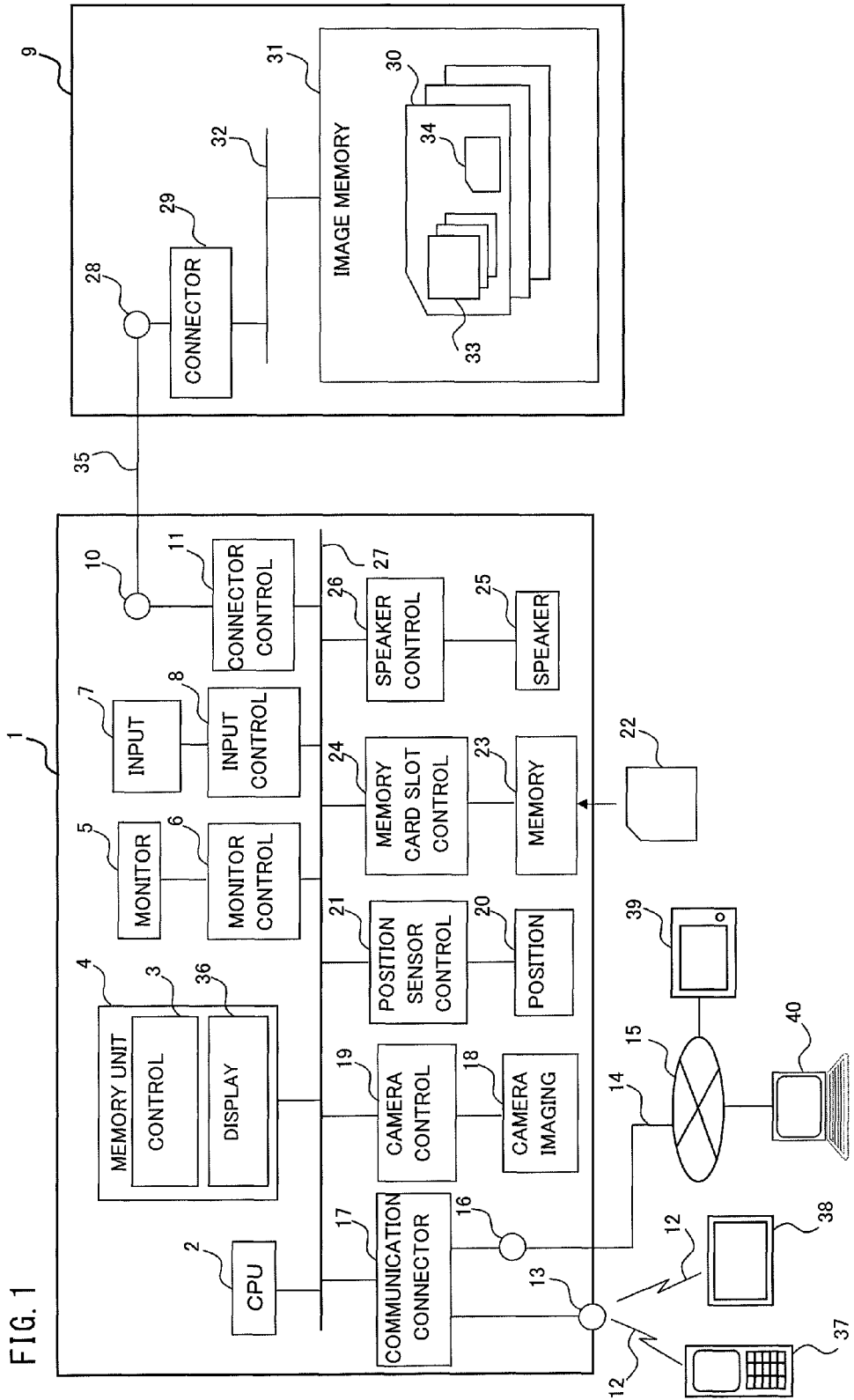
FIG. 1 is a configuration diagram of an image folder transmission/playing device according to a first preferred embodiment of the present invention.

DESCRIPTION OF THE NUMERALS 1 image folder transmission/playing device
2 CPU (control unit)
3 control program
5 monitor (image display unit)
4 memory unit
7 input unit
10 connector (storage device connection unit)
13 antenna (communication unit)
16 communication connector (communication unit)
28 connector (image folder transmission/playing device connection unit)
30 image folder
31 image memory unit
33 image file
34 album setting folder file
36 display program
41 electronic album
43 album title
51 album title file
52 layout file
53 text file
54 album title candidate
55 album layout candidate
57 album layout
59 font pattern
70 adapter device
71 program memory unit
72 connector (image folder transmission/playing device connection unit)
73 connector (storage device connection unit)

DESCRIPTION OF THE PREFERRED EMBODIMENTS

An image folder transmission/playing device according to a first preferred embodiment of the present invention is described with reference to the drawings. FIG. 1 shows a configuration of an image folder transmission/playing device 1 (abbreviated as the device 1 hereinafter) according to the present preferred embodiment. The device 1 includes a CPU 2 (control unit) which controls a whole device, a memory unit 4 which stores a control program 3 to operate the CPU 2, a monitor 5 (image display unit) which displays an image or a character, a monitor control unit 6 which controls the monitor 5, an input unit 7 to which a control command is inputted, an input control unit 8 which controls the input unit 7, a connector 10 (storage device connection unit) to which a storage device 9 is connected, a connector control unit 11 which controls the connector 10, an antenna 13 (communication unit) which transmits and receives a wireless signal 12, a communication connector 16 (communication unit) which is connected to an internet 15 via a LAN cable 14, a communication connector control unit 17 which controls the antenna 13 and the communication connector 16 and a communication connector 16 (communication unit), a camera control unit 19 which controls a camera imaging unit 18 to take an image or a motion picture, a position sensor 20 which detects a position of the device 1 using GPS (Global Positioning System), a position sensor control unit 21 which controls the position sensor 20, a memory card slot 23 into which a memory card 22 is inserted, a memory card slot control unit 24 which controls the memory card slot 23, and a speaker control unit 26 which controls a speaker 25, and they are connected to a bus 27.

The storage device 9 has a connector 28 (image folder transmission/playing device connection unit) to which the device 1 is connected, a connector control unit 29 which controls the connector 28, and an image memory unit 31 which stores at least one image folder 30, and they are connected to a bus 32. Each image folder 30 stores at least one image file 33 taken by a digital camera or a digital video camera and an album setting folder file 34 which is used when the image file 33 is displayed on the monitor 5 as an electronic album. The device 1 is connected to the storage device 9 via a USB cable 35, for example. The memory unit 4 stores a display program 36 which is used to display the image file 33 on the monitor 5 in accordance with information stored in the album setting folder file 34. The monitor 5 has a touch panel function, and the input unit 7 is a keyboard, a mouse, a tablet, or a touch panel of the monitor 5, for example.

The device 1 can be connected to a smartphone 37 or a digital television 38 via the antenna 13, for example. Moreover, the device 1 can be connected to a digital photo frame 39 or an image folder server 40 via the internet 15, for example. The image folder server 40 is a server which stores a number of image folders 30 and transmits and receives the image folder 30 in response to a request from the device 1, the smartphone 37, the digital television 38, or the digital photo frame 39. In the present preferred embodiment, the smartphone 37, the digital television 38, the digital photo frame 39, or the image folder server 40 which is connected to the device 1 preferably has a configuration similar to the image device 1.

The CPU 2 refers to the album setting folder file 34 and displays the image file 33 stored in the storage device 9 as the electronic album. In the present preferred embodiment, the monitor 5 displays the image file 33 for each image folder 30 as the electronic album. Since the CPU 2 refers the album setting folder file 34, the monitor 5 can display the electronic album regardless of whether or not a name of the image folder 30 complies with the DCF standard. Moreover, when a layout of the electronic album displayed on the monitor 5 is set by a user, the CPU 2 stores information on the layout in the album setting folder file 34. Accordingly, the user can display the electronic album on the monitor 5 with the user's favorite layout.

Furthermore, when an optional text is inputted by the user via the input unit 7, the CPU 2 associates the image folder 30 with the optional text. Accordingly, the user can display the optional text on the monitor 5 with the electronic album. When the image folder 30 stored in the storage device 9 is copied to the memory unit 4, the memory card 22, a smartphone 37, or the digital photo frame 39, the CPU 2 copies the album setting folder file 34 with the image file 33. Accordingly, the device 1 can display the image folder 30 stored in the memory unit 4, the memory card 22, the smartphone 37, or the digital photo frame 39 as the electronic album.

Figure 2:
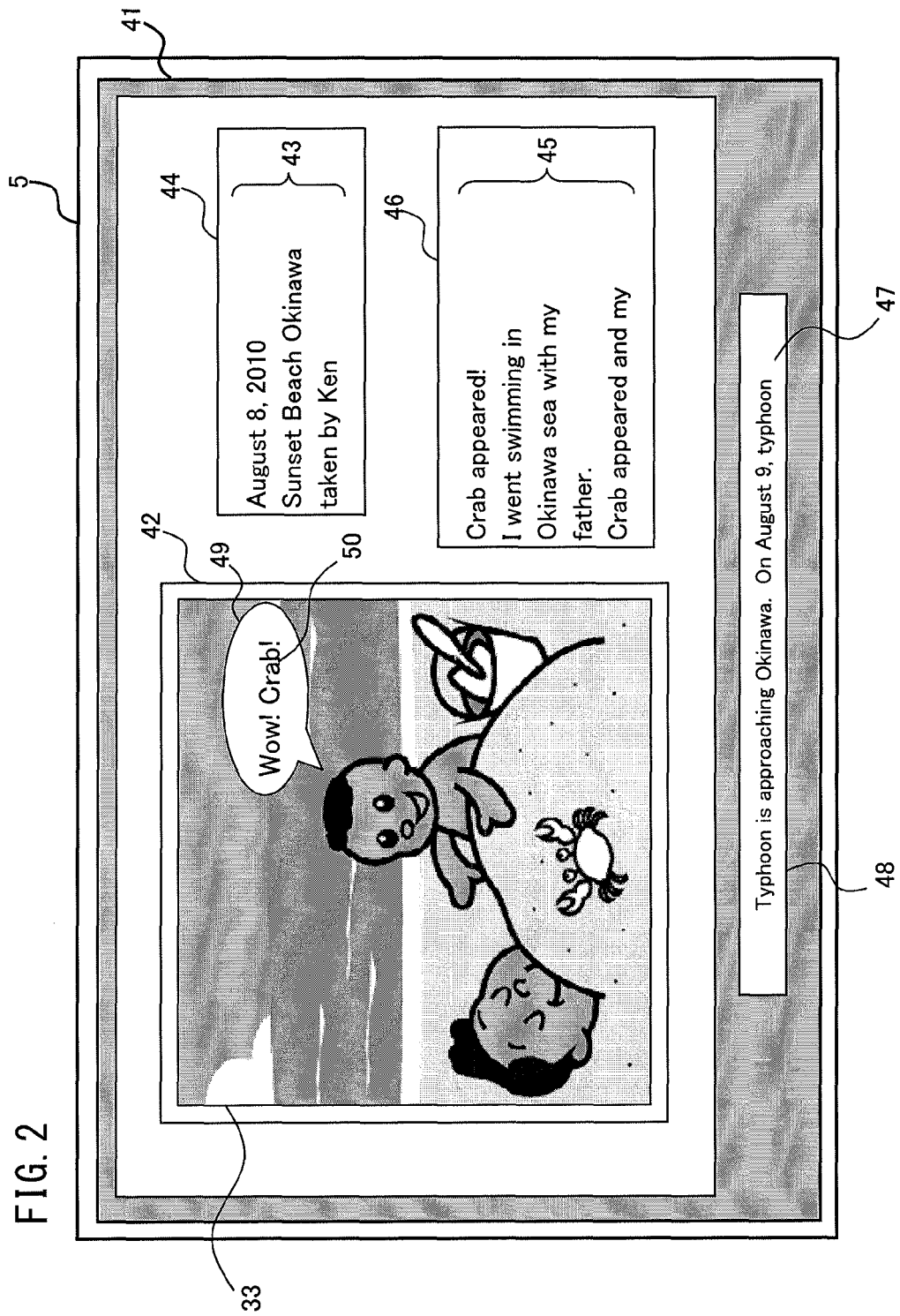
FIG. 2 is a diagram showing a display on an image display unit according to the first preferred embodiment.

FIG. 2 shows an example of a display on a monitor 5 according to the present preferred embodiment. The monitor 5 displays the image file 33 as an electronic album 41. The electronic album 41 displays the image file 33 for each image folder 30. Accordingly, the user can view and manage the large amounts of image files 33 for each image folder 30. The electronic album 41 displays an image display window 42 which displays the image file 33, a title display window 44 which displays an album title 43 of the electronic album 41, a text display window 46 which displays a text 45 provided to the electronic album 41 by the user, and a message display window 48 which displays a message 47 provided to the electronic album 41 by the user and moves the message 47 right to left in the message display window 48. The image display window 42 displays an overlay graphic 49 overlaying on the image file 33. The overlay graphic 49 displays a dialogue 50 provided by the user.

The image file 33 displayed on the image display window 42 is the image file 33 whose shooting date is the earliest in the plural image files 33 stored in the image folder 30, for example. The user inputs the text 45 via the input unit 7 and thus can display a comment or supplementary information for the electronic album 41 on the text display window 46. Moreover, the user inputs the message 47 via the input unit 7 and thus can display a moving message 47 on the message display window 48. Furthermore, the user inputs the dialogue 50 via the input unit 7 and thus can display the image file 33, the overlay graphic 49, and the dialogue 50 in combination on the image display window 42.

Figure 3:
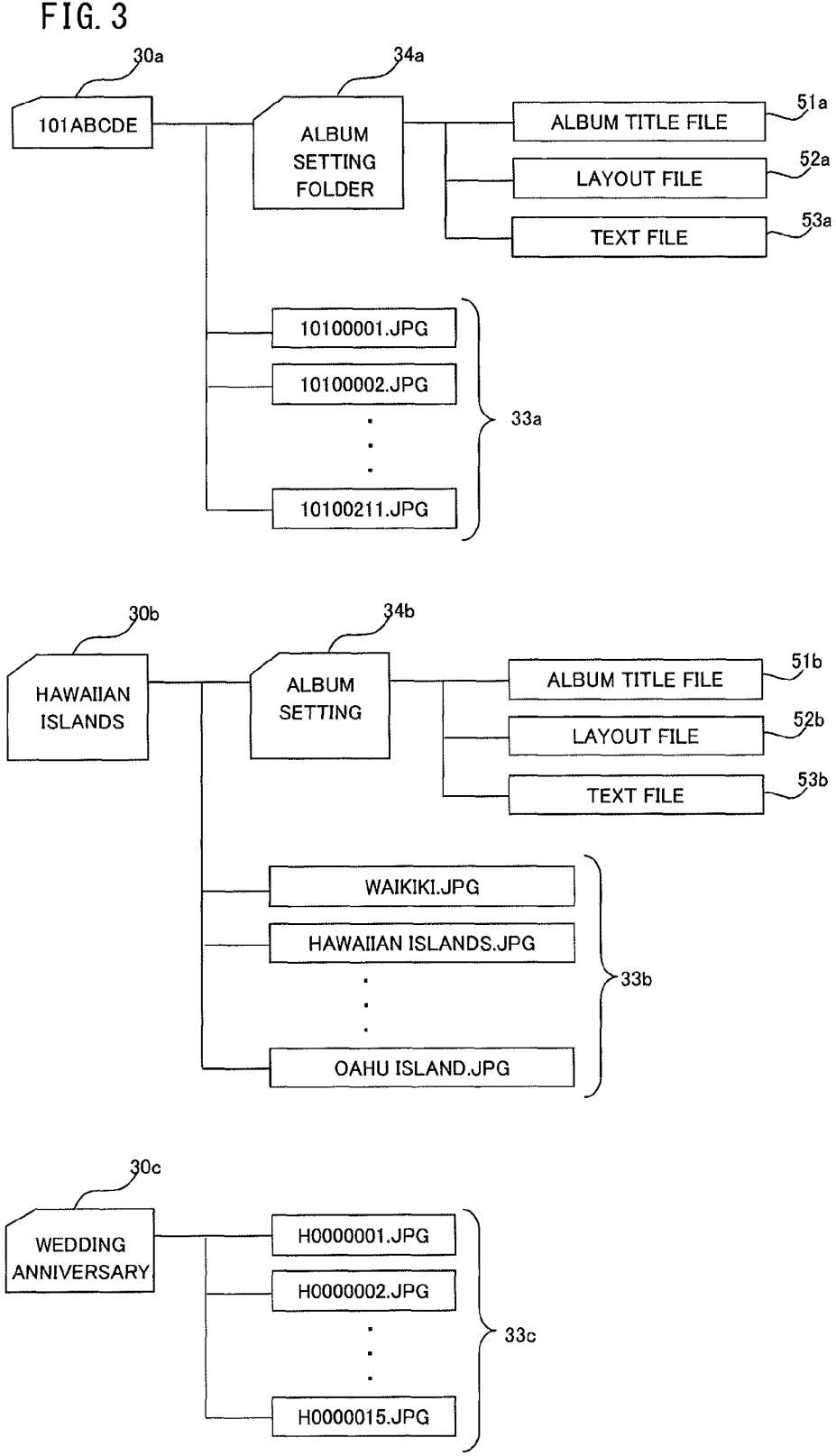
FIG. 3 is a configuration diagram of the image folder according to the first preferred embodiment.

FIG. 3 shows a configuration of the image folder 30 according to the present preferred embodiment. In the present preferred embodiment, the storage device 9 stores image folders 30a to 30c as the image folder 30. A folder name "101ABCDE" which complies with the DCF standard is provided to the image folder 30a. Folder names "Hawaiian islands" and "wedding anniversary" which do not comply with the DCF standard are provided to the images folders 30b and 30c. The image folder 30a has an album setting folder file 34a and the plural image files 33a. The image folder 30b has an album setting folder file 34b and the plural image files 33b. The image folder 30c has the plural image files 33c.

The album setting folder files 34a and 34b have album title files 51a and 51b, layout files 52a and 52b, and text tiles 53a and 53b, respectively. The album title files 51a and 51b have information regarding the album title 43 displayed on the title display window 44. The layout files 52a and 52b have information regarding a layout of the electronic album 41 displayed on the monitor 5. The text files 53a and 53b have information regarding the text 45, the message 47, or the dialogue 50 displayed on the text display window 46, the message display window 48, or the overlay graphic 49, respectively.

A normal digital photo frame cannot display the image file 33 included in the image folder 30 to which the name, which does not comply with the DCF standard, is provided. Thus, the CPU 2 refers to the album setting folder files 34a and 34b included in the image folders 30a and 30b and then displays the image files 33a and 33b included in the image folders 30a and 30b on the image display window 42. Accordingly, the user can display even the image folder 30 to which the name, which does not comply with the DCF standard, is provided on the device 1 as the electronic album 41.

In the present preferred embodiment, the image folder 30c does not have the album setting folder file 34. When the CPU 2 displays the image folder 30c on the device 1 as the electronic album 41, the CPU 2 determines whether or not there is the album setting folder file 34 in the image folder 30c. When there is no album setting folder file 34 in the image folder 30c, the CPU 2 creates the album setting folder file 34 in the image folder 30c. Accordingly, the device 1 can display the electronic album 41 on the monitor 5 regardless of whether or not the name of the image folder 30 complies with the DCF standard.

In the present preferred embodiment, the album setting folder file 34 is included directly in the image folder 30, and the album title file 51, the layout file 52, and the text file 53 are included directly in the album setting folder file 34. Accordingly, the device 1 can rapidly and reliably refer to the album title file 51, the layout file 52, and the text file 53 included in the image folder 30, which are transmitted and received among the storage device 9, the memory card 22, the digital photo frame 39, the smartphone 37, the digital television 38, or the image folder server 40. Since the device 1 can reliably refer to the album title file 51, the layout file 52, and the text file 53 in the image folder 30, even the image folder 30 stored in another equipment can have compatibility to be displayed on the monitor 5 as the electronic album 41.

Next, the album title file 51 included in the album setting folder file 34 is described. FIG. 4 shows an example of a configuration of the album title file 51 according to the present preferred embodiment. The album title file 51 is a file for creating the album title 43 displayed on the title display window 44. The album title file 51 has plural album title candidates 54 which are candidates of the album title 43 and the album title 43 selected from the plural album title candidates 54 by the user. The album title candidate 54 is a shooting date 54a, a shooting location 54b, a shooting person 54c, a date attribute 54d, a shooting mode 54e, an equipment manufacturer name 54f, an equipment model name 54g, and an image title 54h of the image file 33 displayed on the image display window 42.

The CPU 2 refers to FAT data of the image file 33. The CPU 2 converts a creation date information of the FAT data into a predetermined character string and stores it in the album title file 51 as the shooting date 54a. At this time, when the date attribute of the referred creation date information is set in advance, the CPU 2 stores the preset date attribute in the album title file 51 as the date attribute 54d. For example, when the date attribute 54d of August 8 is set as "summer vacation" and the creation date information is Aug. 8, 2010, the CPU 2 sets the date attribute 54d to "summer vacation".

Next, the CPU 2 refers to Exif data of the image file 33. The CPU 2 converts a GPS information of the Exif data into a predetermined character string and stores it in the album title file 51 as the shooting location 54b. Moreover, the CPU 2 stores a creator information, a shooting mode information, an equipment manufacturer name information, an equipment model name information, and an image title information of the Exif data in the album title file 51 as the shooting person 54c, the shooting mode 54e, the equipment manufacturer name 54f, the equipment model name 54g, and an image title 54h, respectively.

The CPU 2 stores at least one album title candidate 54, which is selected by the user via the input unit 7, in the album title file 51 as the album title 43. Accordingly, the user can select at least one album title candidate 54 from the album title candidates 54 created by the CPU 2 and thus can easily create the album title 43.

Figure 5:
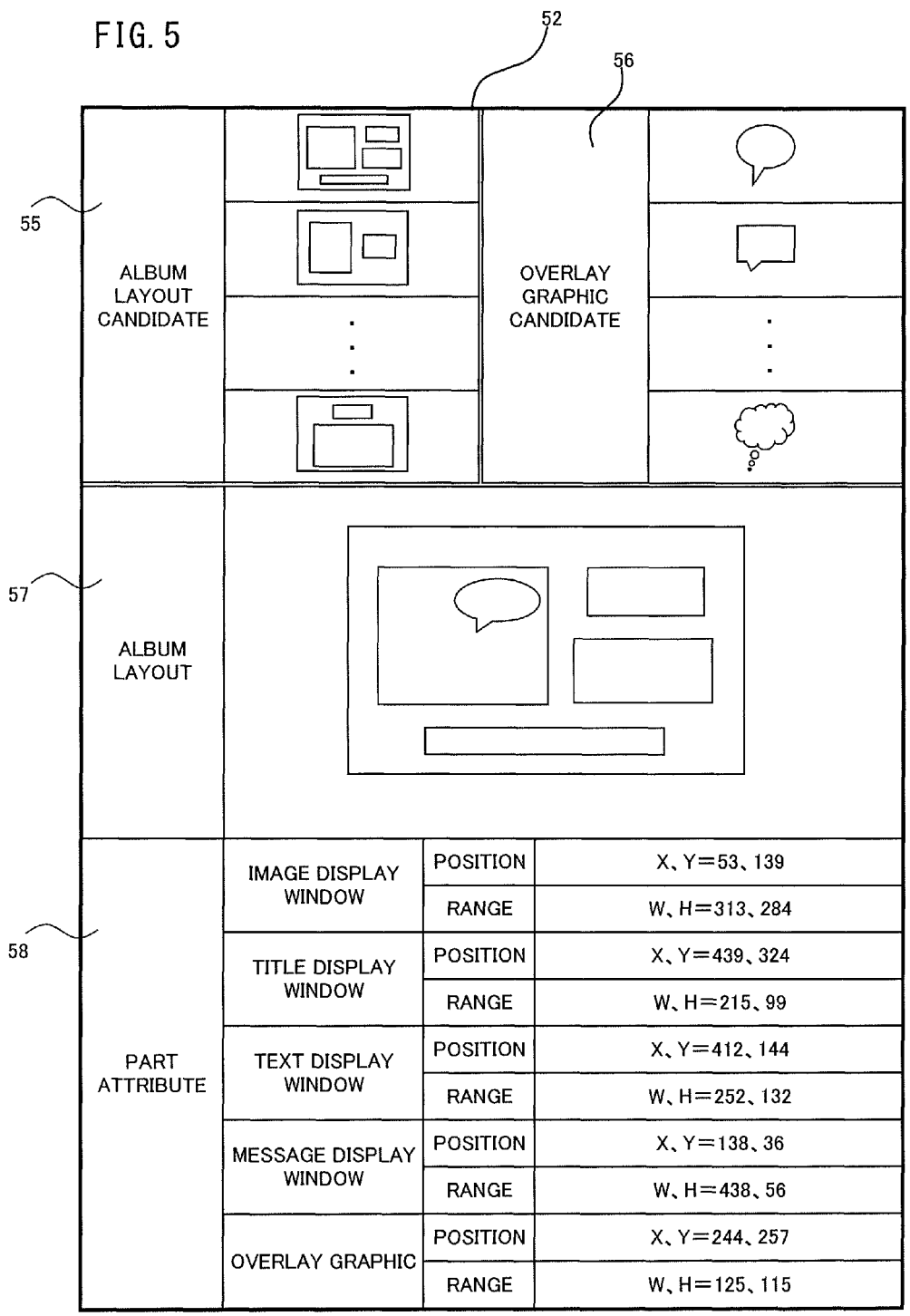
FIG. 5 is a configuration diagram of a layout file according to the first preferred embodiment.

Next, the layout file 52 included in the album setting folder file 34 is described. FIG. 5 shows an example of a configuration of the layout file 52 according to the present preferred embodiment. The layout file 52 is a file for determining a layout of the electronic album 41. The layout file 52 includes an album layout candidate 55 which has plural samples of the layouts for the image display window 42 or the title display window 44, an overlay graphic candidate 56 which has plural samples of the overlay graphics 49 overlaid on the image file 33, an album layout 57 which has the layout of the electronic album 41 set by the user, and a part attribute 58 which has data of a position and a range of the image display window 42, the title display window 44, the text display window 46, the message display window 48, and the overlay graphic 49 constituting the album layout 57. The part attribute 58 has data of a coordinate and a length expressed by pixel as a position and a range of the image display window 42 or the title display window 44, for example.

The CPU 2 stores the album layout candidate 55, which is selected by the user via the input unit 7, in the layout file 52 as the album layout 57. When the overlay graphic candidate 56 is selected by the user via the input unit 7, the CPU 2 stores the selected overlay graphic candidate 56 in the album layout 57 as the overlay graphic 49. The user can adjust the position or the range of the image display window 42 or the title display window 44, for example, via the input unit 7.

The data of the position and the range of the image display window 42 or the title display window 44, for example, is stored in association with the image display window 42, the title display window 44, the text display window 46, the message display window 48, and the overlay graphic 49 as the part attribute 58. Accordingly, the user can display the electronic album 41 on the monitor 5 with the user's favorite layout. Moreover, the user can view the electronic album 41 with the overlay graphic 49 overlaid on the image file 33.

Next, the text file 53 included in the album setting folder file 34 is described. FIG. 6 shows an example of a configuration of the text file 53 according to the present preferred embodiment. The text file 53 is a file for determining a font and a font size of the album title 43, the text 45, the message 47, and the dialogue 50. The text file 53 includes contents of the text 45, the message 47, and the dialogue 50 displayed on the text display window 46, the message display window 48, and the overlay graphic 49, respectively.

The text file 53 includes a font pattern 59 which has plural types of fonts and a text attribute 60 which an attribute of the album title 43, the text 45, the message 47, and the dialogue 50. The CPU 2 stores the font and the font size determined by the user via the input unit 7 in the text file 53 in association with the album title 43, the text 45, the message 47, and the dialogue 50 as the text attribute 60.

Moreover, the CPU 2 stores a character string inputted by the user via the input unit 7 in the text file 53 in association with the text 45, the message 47, and the dialogue 50 as the text attribute 60. Accordingly, the user can display the inputted character string on the text display window 46, the message display window 48, and the overlay graphic 49 with the user's favorite font and font size. Moreover, the user can display the album title 43 on the title display window 44 with the user's favorite font and font size.

Figure 7A:
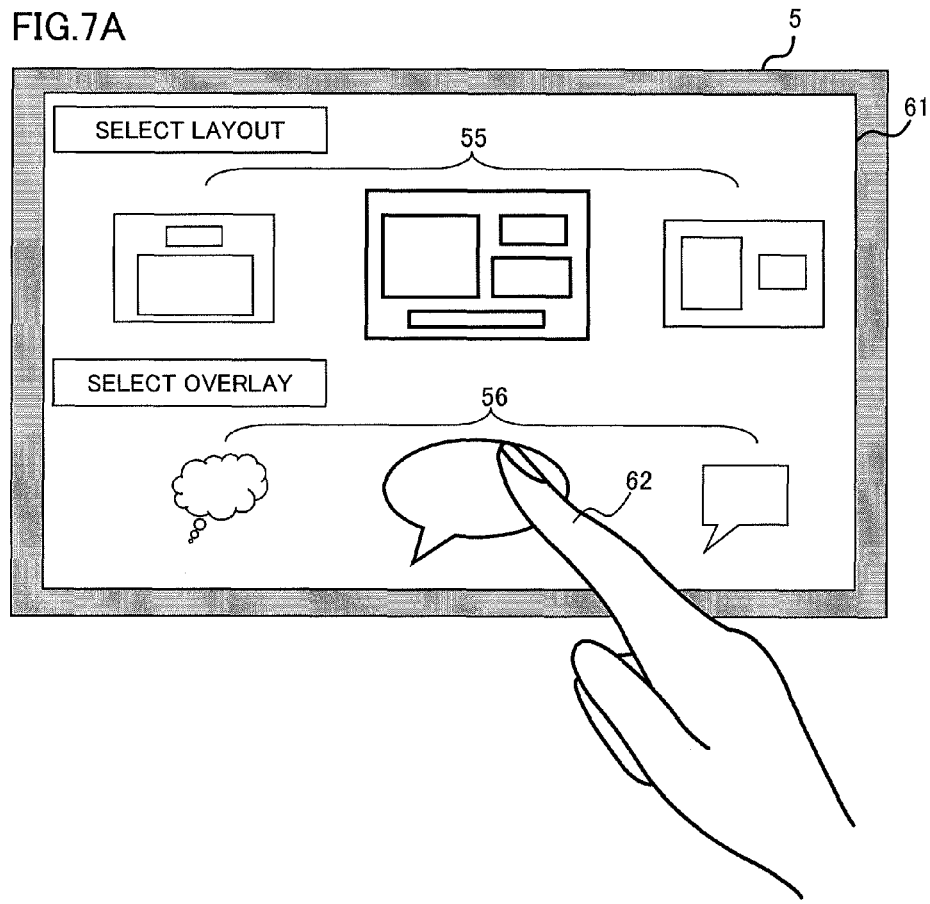
FIGS. 7A and 7B are diagrams showing a layout selection screen according to the first preferred embodiment.
Figure 7B:
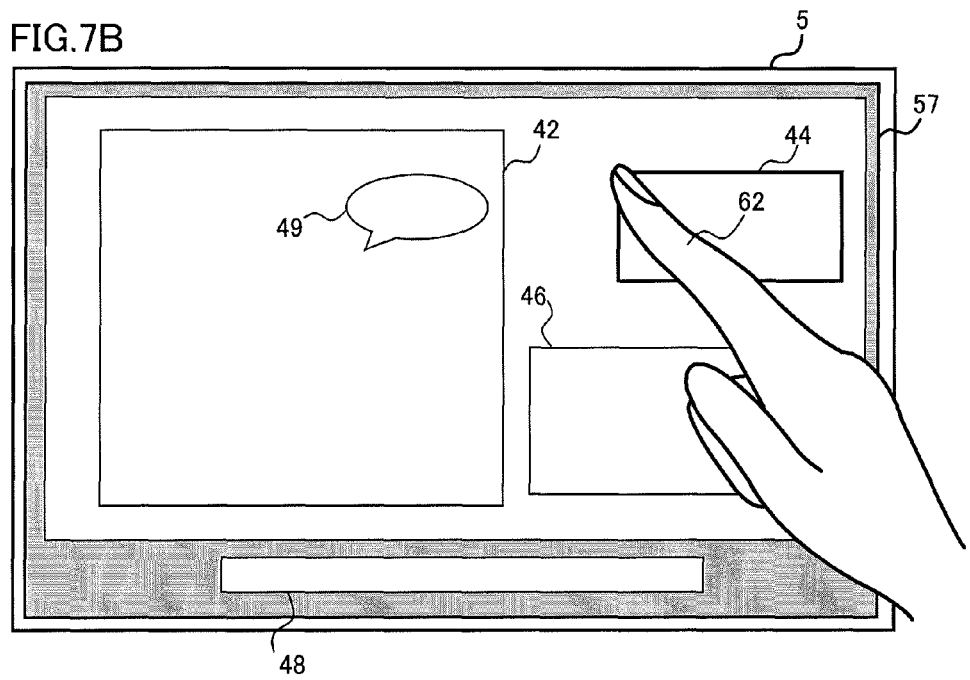

Next, a process of selecting the layout of the electronic album 41 performed by the user is described. FIGS. 7A and 7B show an example of a layout selection screen 61 according to the present preferred embodiment. FIG. 7A shows a configuration of the layout selection screen 61 and FIG. 7B shows a configuration of the album layout 57 determined by the user. In FIG. 7A, when the layout file 52 is created in the album setting folder file 34 in the image folder 30, the CPU 2 displays the layout selection screen 61 on the monitor 5. The layout selection screen 61 displays the album layout candidate 55 and the overlay graphic candidate 56.

The user selects the desired album layout candidate 55 or the overlay graphic candidate 56 from the album layout candidate 55 and the overlay graphic candidate 56 displayed on the layout selection screen 61 with a finger 62. The CPU 2 stores the album layout candidate 55 and the overlay graphic candidate 56 selected by the user in the layout file 52 as the album layout 57. Moreover, the CPU 2 stores the data of the position and the range of the image display window 42, the title display window 44, the text display window 46, the message display window 48, and the overlay graphic 49 as the part attribute 58.

In FIG. 7B, the monitor 5 displays the created album layout 57. The user selects the title display window 44 constituting the album layout 57 and drags it with the finger 62, and thus can change the position or the range of the title display window 44. The monitor 5 displays the title display window 44 selected by the finger 62 of the user in a thick-frame pattern. Accordingly, the user can easily recognize the selected title display window 44. The CPU 2 newly stores the changed position or range of the title display window 44 in the layout file 52 as the part attribute 58. Accordingly, the user can create the user's favorite album layout 57 easily and simply.

Figure 8A:
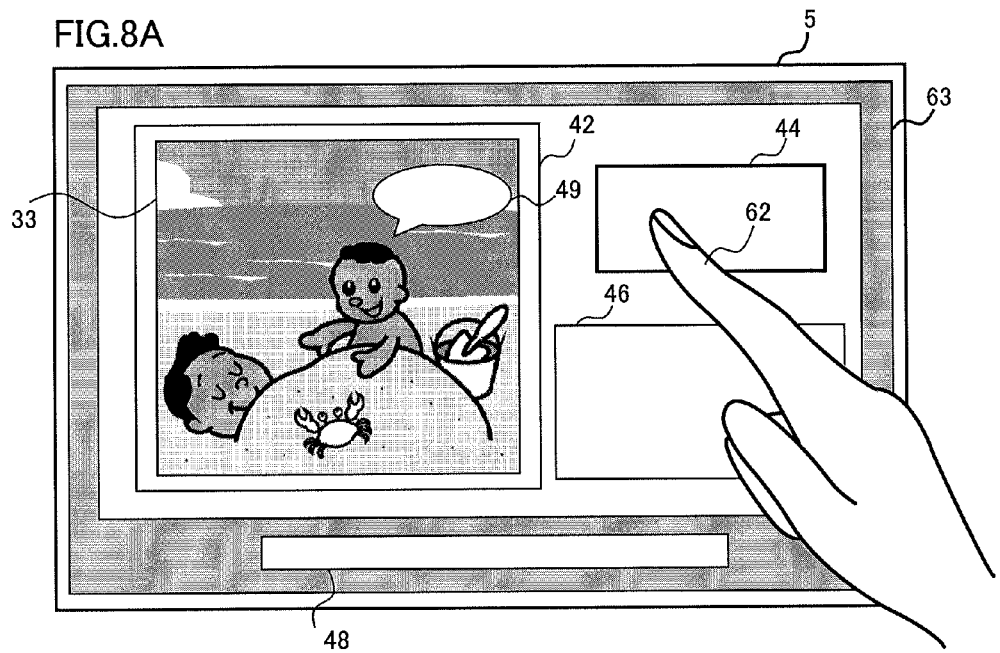
FIGS. 8A and 8B are diagrams showing an album title selection screen according to the first preferred embodiment.
Figure 8B:
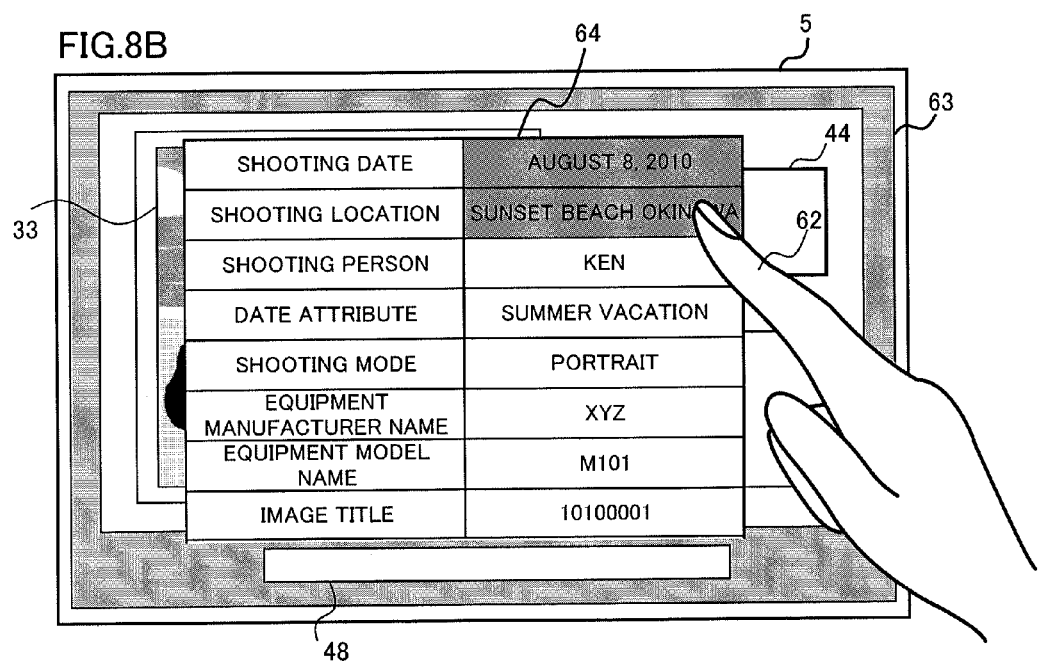

Next, a process of selecting the album title 43 of the electronic album 41 performed by the user is described. FIGS. 8A and 8B show an example of an album title selection screen 63 according to the present preferred embodiment. FIG. 8A shows a configuration of the album title selection screen 63 and FIG. 8B shows a state that the album title candidate 54 is selected by the user. In FIG. 8A, when the title display window 44 is selected by the finger 62 of the user, the album title selection screen 63 displays the selected title display window 44 in a thick-frame pattern.

Next, in FIG. 8B, the album title selection screen 63 displays an album title candidate list 64 included in the album title file 51. The user selects at least one album title candidate 54 from the album title candidate list 64 and creates the album title 43. At this time, the album title candidate list 64 changes a background color of the selected album title candidate 54. Accordingly, the user can confirm the selected album title candidate 54. The CPU 2 stores the created album title 43 in the album title file 51. Accordingly, the user can create the album title 43 in accordance with the image folder 30 easily and simply.

Next, a process of inputting the character string, which is displayed on the text display window 46, performed by the user is described. FIGS. 9A and 9B show an example of a text input screen 65 according to the present preferred embodiment. FIG. 9A shows a configuration of the text input screen 65 and FIG. 9B shows a state that the text 45 displayed on the text display window 46 is inputted by the user. In FIG. 9A, when the text display window 46 is selected by the finger 62 of the user, the text input screen 65 displays the selected text display window 46 in a thick-frame pattern.

Next, in FIG. 9B, the text input screen 65 displays a software keyboard 66. The user inputs the text 45 via the software keyboard 66. The CPU 2 stores the inputted text 45 in the text file 53 as the text attribute 60. In the text input screen 65, the user can input the message display window 48 and the overlay graphic 49 in the same manner as the text 45. Accordingly, the user can view the inputted character string with the image file 33 as the comment or the supplementary information for the electronic album 41.

Next, an image folder search screen 67 in which the user searches for the image folder 30 is described. FIG. 10 shows an example of the image folder search screen 67. The image folder search screen 67 includes a search information display unit 68 which displays the album title candidate 54, the text 45, the message 47, and the dialogue 50 of the image folder 30 and an electronic album display button 69 which displays the image folder 30 selected by the user on the monitor 5 as the electronic album 41. When a command of displaying the image folder search screen 67 on the monitor 5 is inputted via the input unit 7, the CPU 2 refers to the album title file 51 and the text file 53. The CPU 2 displays the album title candidate 54, the text 45, the message 47, and the dialogue 50 of the image folder 30 on the search information display unit 68 for each image folder 30.

The user selects the character string displayed on the search information display unit 68 and thus can select the image folder 30 corresponding to the character string. When the electronic album display button 69 is pressed after the image folder 30 is selected, the CPU 2 displays the selected image folder 30 on the monitor 5 as the electronic album 41. In the present preferred embodiment, the album title candidate 54, the text 45, the message 47, and the dialogue 50 are inputted by the user, so that they are made up of a character string which is familiar to the user, respectively. The user uses the image folder search screen 67 and thus can search for the desired image folder 30 rapidly and easily in accordance with the familiar character string.

Figure 11:
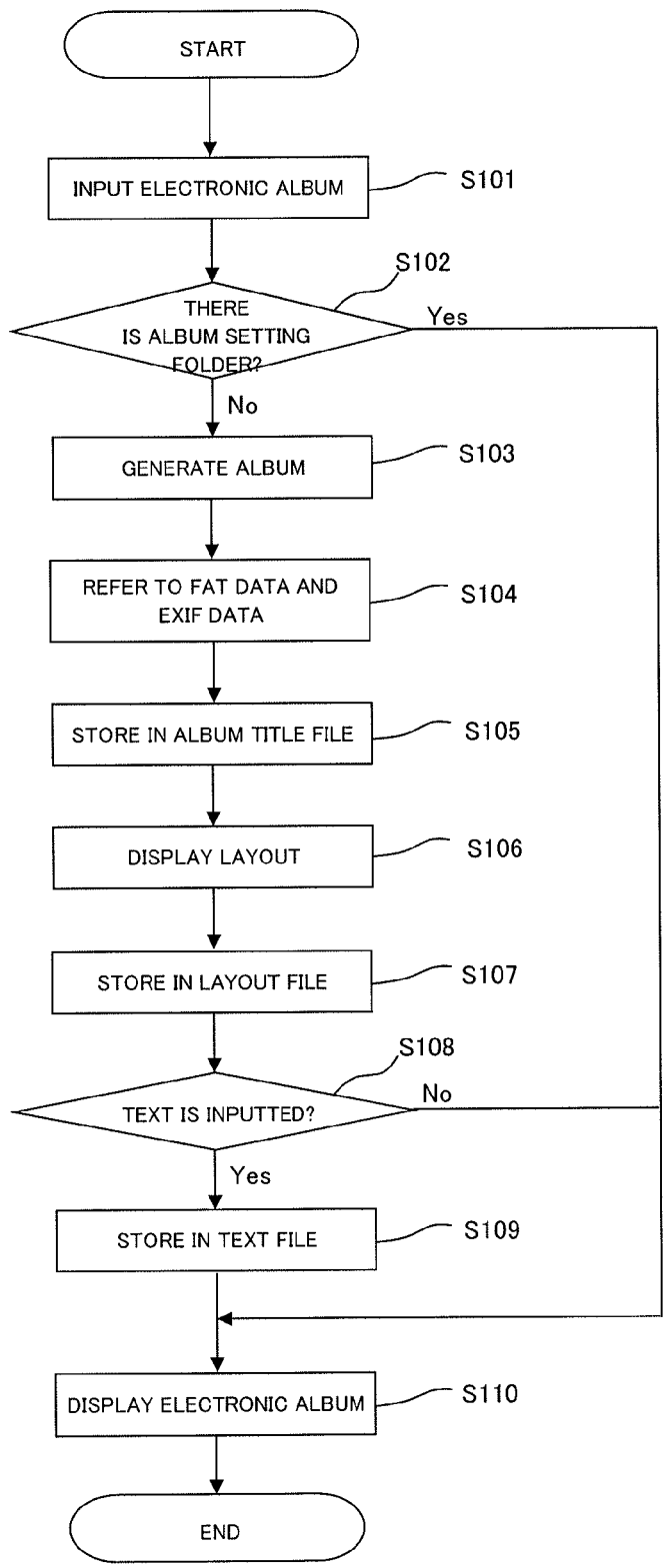
FIG. 11 is a flow chart of a processing for displaying an electronic album according to the first preferred embodiment.

Next, a processing of the CPU 2 displaying the electronic album 41 on the monitor 5 is described. FIG. 11 shows a flow chart of a process for displaying the electronic album 41 on the monitor 5. When a command of displaying the electronic album 41 of the image folder 30 stored in the storage device 9 on the monitor 5 is inputted via the input unit 7 (S101), the CPU 2 determines whether or not there is the album setting folder file 34 in the image folder 30 (S102). When there is no album setting folder file 34 in the step S102 (No in S102), the CPU 2 creates the album setting folder file 34 in the image folder 30 (S103). In the present preferred embodiment, the album setting folder file 34 is created directly in the image folder 30. When the CPU 2 creates the album setting folder file 34, the CPUC 2 creates the album title file 51, the layout file 52, and the text file 53 in the album setting folder file 34.

The CPU2 selects one image file 33 from the plural image files 33 included in the image folder 30 and refers to the FAT data and the Exif data of the selected image file 33 (S104). In the present preferred embodiment, the selected image file 33 is, for example, an image file 33 whose date and time, on which the image file 33 is stored in the FAT data and the Exif data, is the earliest. The CPU 2 converts the creation date information of the FAT data into the predetermined character string and stores it in the album title file 51 as the shooting date 54$a$ (S105). At this time, when the date attribute 54$d$ of the referred creation date information is set in advance, the CPU 2 stores the preset date attribute 54$d$ in the album title file 51.

Moreover, the CPU 2 converts the GPS information of the Exif data into the predetermined character string and stores it in the album title file 51 as the shooting location 54$b$. Furthermore, the CPU 2 stores the creator information, the shooting mode information, the equipment manufacturer name information, the equipment model name information, and the image title information of the Exif data in the album title file 51 as the shooting person 54$c$, the shooting mode 54$e$, the equipment manufacturer name 54$f$, the equipment model name 54$g$, and the image title 54$h$, respectively.

The CPU 2 displays the layout selection screen 61 on the monitor 5 (S106). The CPU stores the album layout candidate 55 and the overlay graphic candidate 56 selected by the user in the layout file 52 as the album layout 57 (S107). Subsequently, the CPU 2 determines whether or not the text 45, the message 47, or the dialogue 50 is input to the text input screen 65 (S108). When the text 45, the message 47, or the dialogue 50 is inputted to the text input screen 65 (Yes in S108), the CPU 2 stores the inputted text 45, the message 47, or the dialogue 50 in the text file 53 (S109). When the text 45, the message 47, or the dialogue 50 is not inputted to the text input screen 65 in the step S108 (No in S108), the CPU 2 performs a process of a step S110.

When there is the album setting folder file 34 in the step S102 (Yes in S102), the CPU 2 performs the process of the step S110. The CPU 2 displays the electronic album 41 on the monitor 5 in accordance with the information included in the album setting folder file 34 (S110). Accordingly, the user can easily provide the album title 43 to the electronic album 41 and can simply create the favorite album layout 57. Moreover, the user can display the electronic album 41 on the monitor 5 regardless of whether or not the name of an image folder 30 complies with the DCF standard.

Figure 12:
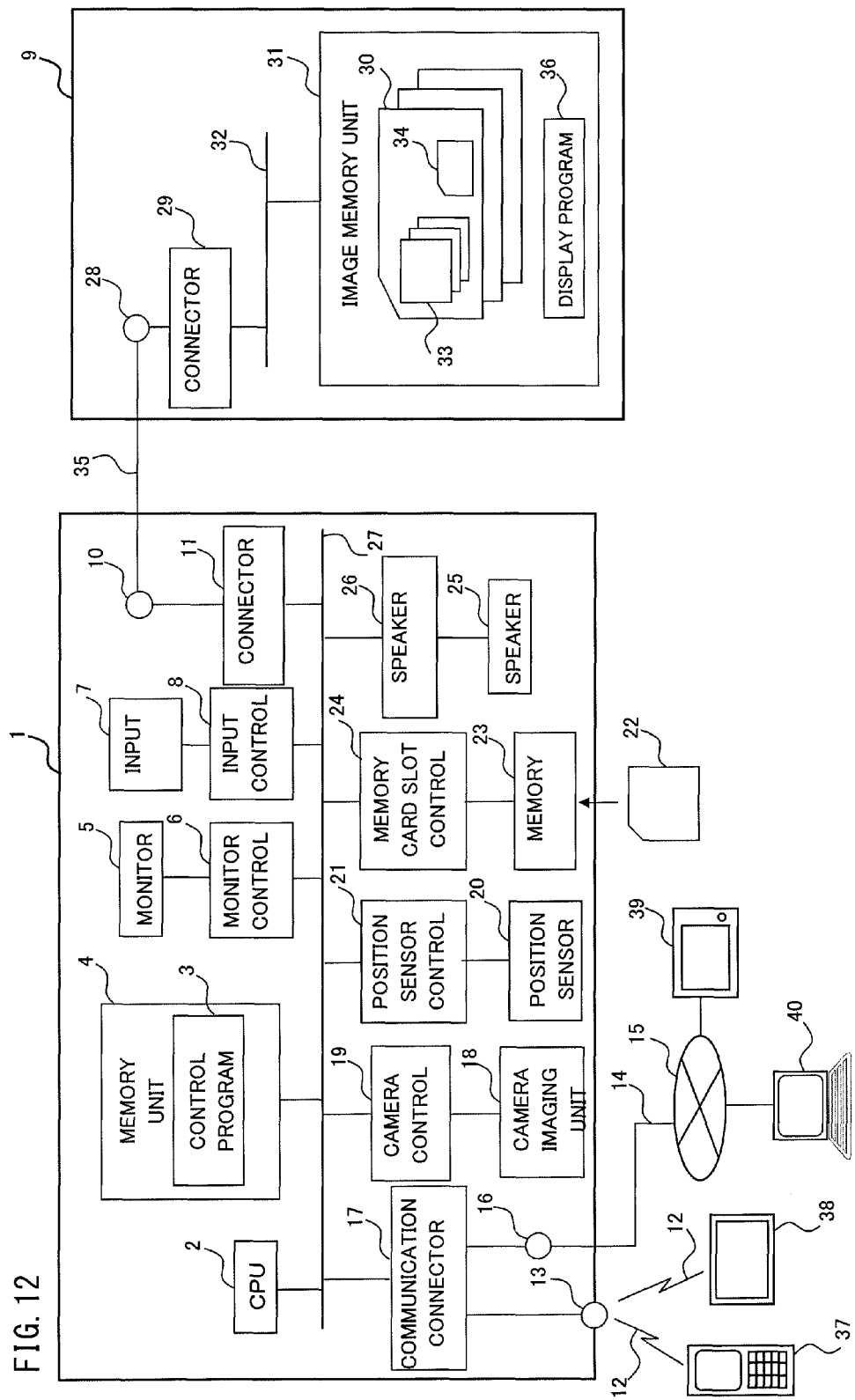
FIG. 12 is a configuration diagram of a storage device according to a second preferred embodiment.

Next, a storage device 9 according to a second preferred embodiment of the present invention is described with reference to the drawings. FIG. 12 shows a configuration of the storage device 9 according to the present preferred embodiment. The storage device 9 has a connector 28 to which an image folder transmission/playing device 1 (abbreviated as the device 1 hereinafter) is connected, a connector control unit 29 which controls the connector 28, and an image memory unit 31 which stores at least one image folder 30, and they are connected to a bus 32. The image memory unit 31 stores a display program 36 in addition to the image folder 30. In the present preferred embodiment, the memory unit 4 included in the device 1 does not store the display program 36 unlike the first preferred embodiment of the present invention. When the storage device 9 which has the display program 36 is connected to the connector 10, the CPU 2 makes the display program 36 work. Accordingly, even when the device 1 does not include the display program 36, the user can display the image folder 30 stored in the image memory unit 31 on the monitor 5 as the electronic album 41. Moreover, even when the device 1 is a conventional digital television or digital photo frame, for example, the storage device 9 can display the electronic album 41 on the monitor 5 by transmitting the image folder 30 stored in the storage device 9 to the device 1.

Figure 13:
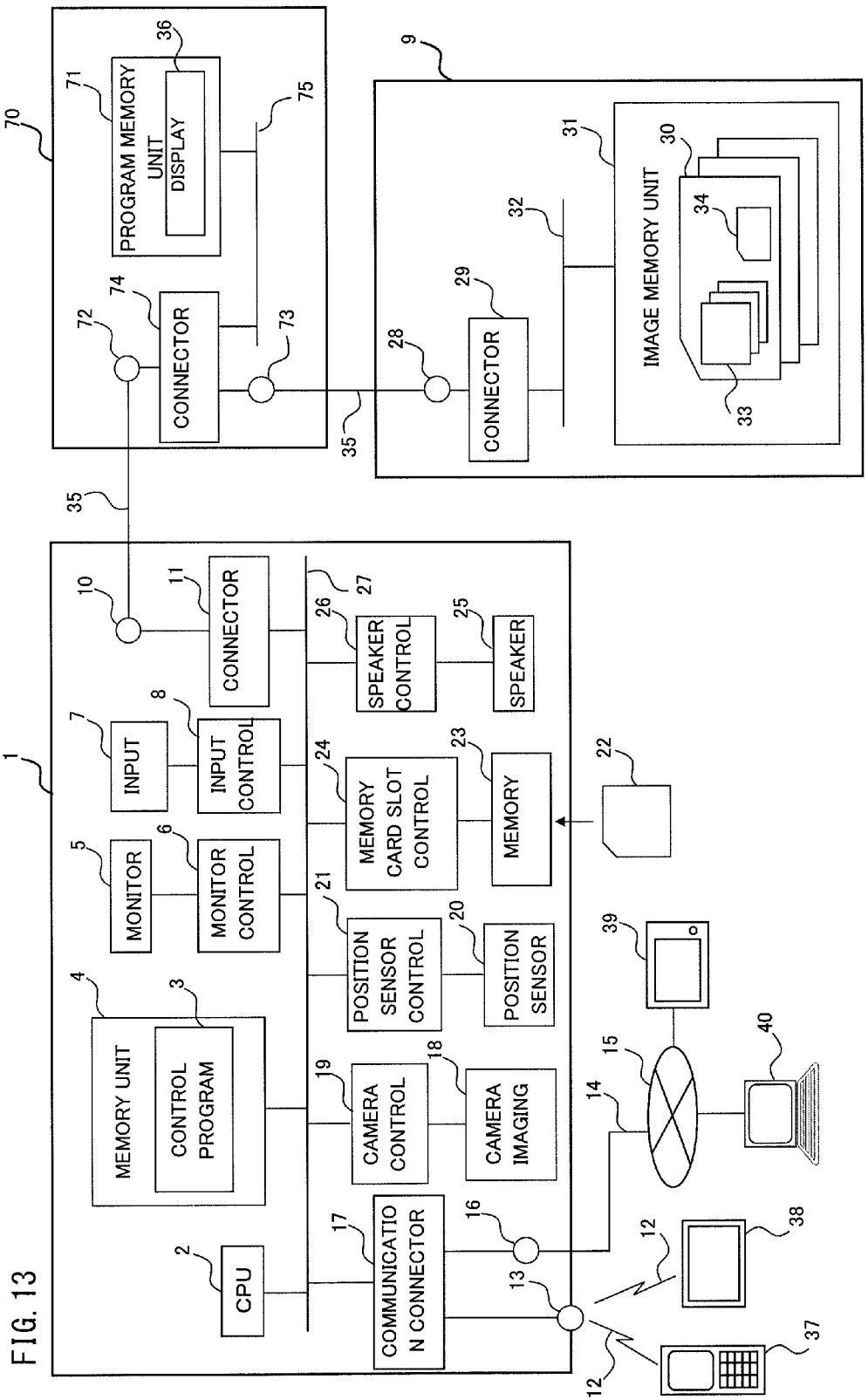
FIG. 13 is a configuration diagram of an adapter device according to a third preferred embodiment.

Next, an adapter device 70 according to a third preferred embodiment of the present invention is described with reference to the drawings. FIG. 13 shows a configuration of the adapter device 70 according to the present preferred embodiment. The adapter device 70 is connected to an image folder transmission/playing device 1 (abbreviated as the device 1 hereinafter) and the storage device 9. In the present preferred embodiment, a memory unit 4 included in the device 1 does not store a display program 36 unlike the first preferred embodiment of the present invention. The adapter device 70 has a program memory unit 71 which stores the display program 36, a connector 73 (storage device connection unit) to which the storage device 9 is connected, a connector 72 (image folder transmission/playing device connection unit) to which the device 1 is connected, and a connector control unit 74 which controls the connector 72 and the connector 73, and they are connected to a bus 75.

In the present preferred embodiment, the adapter device 70 is connected to the device 1 and the storage device 9 via a USB cable 35, for example. When the adapter device 70 is connected to the connector 10 and the connector 28, the CPU 2 makes the display program 36 work. Accordingly, even when none of the device 1 and the storage device 9 do includes the display program 36, the user can display the image folder 30 stored in the image memory unit 31 of the storage device 9 on the monitor 5 as the electronic album 41. Moreover, when the adapter device 70 is connected to an electronic equipment such as a conventional digital television, digital photo frame, mobile phone, smartphone, or smart tablet, for example, the electronic equipment can transmit and receive the image folder 30 and display the electronic album 41 on the monitor 5 without a significant change of design.

In the first to third preferred embodiments, the device 1 may also have a configuration to output an audio or a music from the speaker 25 when the electronic album 41 is displayed. Moreover, in the first to third preferred embodiments, the example of constituting the device 1 separately from the digital photo frame 39, the smartphone 37, the digital television 38, or the image folder server 40, however the device 1 may have a configuration to function as the digital photo frame 39, the smartphone 37, the digital television 38, the image folder server 40, or the smart tablet. Furthermore, in the second or third preferred embodiment, the example of connecting the storage device 9 or the adapter device 70 to the digital photo frame 39, the smartphone 37, the digital television 38, the image folder server 40, the smart tablet, or the personal computer instead of the device 1.

The invention claimed is:

1. An image folder transmission/playing device which displays an image file or a character stored in an image folder, comprising:

an image display unit which displays the image file or the character;

an input unit to which the character or an operation command is inputted by a user;

a control unit which controls the image folder transmission/playing device;

a memory unit which stores a control program to operate the control unit;

a storage device connection unit to which a storage device, which stores the image folder, is connected; and a communication unit which transmits and receives the image folder via a wire communication or a wireless communication, wherein the memory unit stores a display program which displays the image file stored in the image folder and an attribute information of the image file on the image display unit, the attribute information is FAT (File Allocation Table) data or Exif (Exchangeable Image File Format) data of the image file, and when the storage device is connected to the storage device connection unit, when the communication unit receives the image folder and the image file and stores them in the memory unit, or when the image folder and the image file are copied from the storage device to another device, the control unit performs processings of:

determining whether or not there is an album setting folder file which displays the image file or the attribute information of the image file on the image display unit for each image folder as an electronic album, wherein the image file is stored in the image folder, in the memory unit, or in the other device;

creating the album setting folder file in the image folder, in the memory unit, or in the other device when there is no album setting folder file in the image folder, in the memory unit, or in the other device;

displaying the electronic album on the image display unit in accordance with information included in the album setting folder file when there is the album setting folder file in the image folder, in the memory unit, or in the other device;

creating an album title file used for creating an album title of the electronic album in the album setting folder file when the album setting folder file is created in the image folder, in the memory unit, or in the other device;

selecting one image file from the one or plural image files stored in the image folder, in the memory unit, or in the other device and referring to the FAT data or the Exif data of the image file;

converting date information, time information, or GPS (Global Positioning System) information included in the FAT data or the Exif data as a numerical value into a predetermined character string and storing the character string in the album title file as an album title candidate or storing image title information, shooting person information, or an equipment information included in the FAT data or the Exif data as a text data without change as the album title candidate in the album title file;

storing a selected album title candidate in the album title file as the album title when at least one album title candidate is selected via the input unit; and displaying the electronic album on the image display unit in accordance with the album title file.

2. The image folder transmission/playing device according to claim 1, wherein the control unit performs processings of:
further creating a layout file which has information of an album layout for the electronic album displayed on the image display unit and a text file which has an optional text inputted via the input unit in the album setting folder file when the album setting folder file is created in the image folder, in the memory unit, or in the other device;
storing plural album layout candidates as templates of the album layout, the album layout candidate selected via the input unit as the album layout, a position or a range of the image file, the album title, or the text displayed on the image display unit in the layout file;
storing plural font patterns for the album title or the text and the font pattern selected via the input unit and a font size inputted via the input unit in association with the album title or the text in the text file; and
displaying the electronic album on the image display unit in accordance with the layout file or the text file.

3. The image folder transmission/playing device according to claim 1, wherein
the control unit performs processings of:
associating the character string included in the album title file or the text file with the image folder and displaying the character string on the image display unit when a command of searching for the image folder is inputted via the input unit; and
displaying the electronic album on the image display unit when the image folder is selected via the input unit.

4. The image folder transmission/playing device according to claim 2, wherein
the control unit performs processings of:
associating the character string included in the album title file or the text file with the image folder and displaying the character string on the image display unit when a command of searching for the image folder is inputted via the input unit; and
displaying the electronic album on the image display unit when the image folder is selected via the input unit.

5. A storage device used for the image folder transmission/playing device according to claim 1, comprising:
an image folder transmission/playing device connection unit to which the image folder transmission/playing device is connected; and
an image memory unit which stores the image folder and the display program.

6. An adapter device used for the image folder transmission/playing device according to claim 1 and connected to the storage device, comprising:
an image folder transmission/playing device connection unit to which the image folder transmission/playing device is connected;
a storage device connection unit to which the storage device is connected; and
a program memory unit which stores the display program.

7. An image folder transmission/playing method for making a computer display an image file, wherein the computer comprises a processor, an image display unit which displays the image file or a character, an input unit to which the character or an operation command is inputted by a user, a storage device connection unit to which a storage device is connected, a control unit which controls an image folder transmission/playing device, a memory unit which stores a control program to operate the control unit and an attribute information, which is FAT (File Allocation Table) data or Exif (Exchangeable Image File Format) data of the image file, and a communication unit which transmits and receives the image folder via a wire communication or a wireless communication,
the image folder transmission/playing method comprising the steps of:
when the storage device is connected to the storage device connection unit, when the communication unit receives the image folder and the image file and stores them in the memory unit, or when the image folder and the image file are copied from the storage device to another device:
determining, by the processor, whether or not there is an album setting folder file which displays the image file or the attribute information of the image file on the image display unit for each image folder as an electronic album, wherein the image file is stored in the image folder, in the memory unit, or in the other device;
creating, by the processor, the album setting folder file in the image folder, in the memory unit, or in the other device, when there is no album setting folder file in the image folder, in the memory unit, or in the other device;
displaying, by the processor, the electronic album on the image display unit in accordance with information included in the album setting folder file when there is the album setting folder file in the image folder, in the memory unit, or in the other device;
creating, by the processor, an album title file used for creating an album title of the electronic album in the album setting folder file when the album setting folder file is created in the image folder, in the memory unit, or in the other device;
selecting, by the processor, one image file from the one or plural image files included in the image folder, in the memory unit, or in the other device and referring to the FAT data or the Exif data of the image file;
converting, by the processor, date information, time information, or GPS (Global Positioning System) information included in the FAT data or the Exif data as a numerical value into a predetermined character string and storing the character string in the album title file as an album title candidate or storing image title information, shooting person information, or an equipment information included in the FAT data or the Exif data as a text data without change as the album title candidate in the album title file;
storing, by the processor, a selected album title candidate in the album title file as the album title when at least one album title candidate is selected via the input unit; and
displaying, by the processor, the electronic album on the image display unit in accordance with the album title file.

8. The image folder transmission/playing method according to claim 7, further comprising:

creating, by the processor, a layout file which has information of an album layout for the electronic album displayed on the image display unit and a text file which has an optional text inputted via the input unit in the album setting folder file when the album setting folder file is created in the image folder, in the memory unit, or in the other device;

storing, by the processor, plural album layout candidates as templates of the album layout, the album layout candidate selected via the input unit as the album layout, a position or a range of the image file, the album title, or the text displayed on the image display unit in the layout file;

storing, by the processor, plural font patterns for the album title or the text and the font pattern selected via the input unit and a font size inputted via the input unit in association with the album title or the text in the text file; and displaying, by the processor, the electronic album on the image display unit in accordance with the layout file and the text file.

9. The image folder transmission/playing method according to claim 8, further comprising:

associating, by the processor, the character string included in the album title file or the text file with the image folder and displaying the character string on the image display unit when a command of searching for the image folder is inputted via the input unit; and displaying, by the processor, the electronic album on the image display unit when the image folder is selected via the input unit.

10. The image folder transmission/playing method according to claim 9, further comprising:

associating, by the processor, the character string included in the album title file or the text file with the image folder and displaying the character string on the image display unit when a command of searching for the image folder is inputted via the input unit; and displaying, by the processor, the electronic album on the image display unit when the image folder is selected via the input unit.

* * * * *